United States Patent [19]

Horwitz et al.

[11] 4,041,994
[45] Aug. 16, 1977

[54] DOSE DISPENSER FOR RADIOACTIVE GAS

[76] Inventors: Norman H. Horwitz, 6608 Cottonwood Knoll, West Bloomfield Hills, Mich. 48033; Robert F. Gutkowski, 36824 Manning Court, Sterling Heights, Mich. 48077

[21] Appl. No.: 615,737

[22] Filed: Sept. 22, 1975

[51] Int. Cl.$^2$ .............................................. B65B 3/04
[52] U.S. Cl. ........................................ 141/1; 141/83; 141/329; 250/356
[58] Field of Search ............... 141/83, 19, 329, 330, 141/1-12; 250/356, 364, 328, 432 PD, 374, 380

[56] References Cited
U.S. PATENT DOCUMENTS 3,866,057  2/1975  Spragg et al. ................... 250/356

Primary Examiner—Houston S. Bell, Jr.
Attorney, Agent, or Firm—Cullen, Settle, Sloman & Cantor

[57] ABSTRACT

An activity metering apparatus for metering predetermined activities of radioactive gas from a supply ampul to dose vials. The apparatus includes a shielded ampul housing, a fine metering valve communicating with the ampul housing chamber, a shielded vial housing and a hypodermic needle communicating with the metering valve and received through an opening in the vial housing. A Geiger-Muller tube is adjustably supported opposite an opening in the vial housing, whereby the activity of the radioactive gas dispensed to a partially evacuated vial within the vial chamber may be read directly by a standard laboratory rate meter.

13 Claims, 3 Drawing Figures

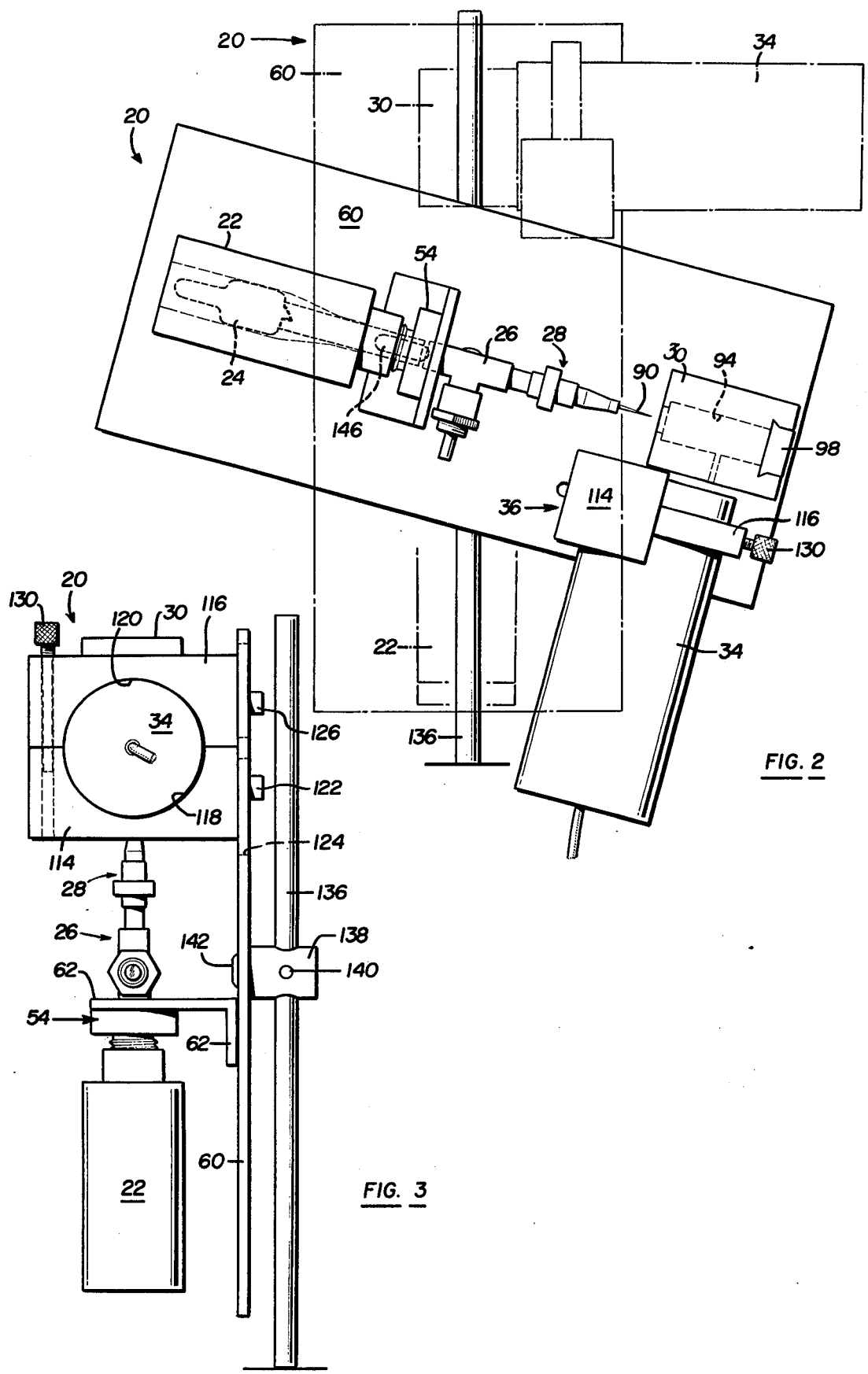

DOSE DISPENSER FOR RADIOACTIVE GAS

FIELD OF THE INVENTION

This invention relates to an activity metering apparatus for radioactive gases, which is particularly suitable for nuclear medicine, wherein predetermined doses of radioactive gases are utilized, particularly Xenon 133

DESCRIPTION OF THE PRIOR ART

Radioactive gases, particularly Xenon 133, is available to hospitals and medical laboratories in two forms; multi-Curie shipping ampuls and serum vials containing a specified activity of gas. Serum vials containing a predetermined activity of radioactivity gas are however relatively expensive and the radioactivity of the dose will decay, requiring a determination of the radioactivity prior to use. Gaseous radioactive Xenon 133, for example, is also available in standard 5cc shipping ampuls from Oak Ridge National Laboratories. An inexpensive method of metering a predetermined activity of radioactive gas from a multi-Curie shipping ampul to a serum via has not however been developed. The activity metering apparatus of this invention is relatively simple and inexpensive and may be utilized by hospitals and medical laboratories for metering a predetermined activity dose to serum vials, immediately prior to use.

The importance of pulmonary ventilation imaging employing radioactive gases, particularly Xenon 133, has been appreciated for many years. When used in conjunction with the traditional perfusion lung scan, the diagnosis of pulmonary embolism becomes considerably more reliable. Areas which are poorly perfused, but adequately ventilated, have a high probability of being involved in the embolic process, see "Ventilation-perfusion lung scanning for pulmonary emboli", British Medical Journal, 1; 600–602, March 30, 1974. In addition, studies of regional lung function and scintillation camera radio radiospirometry have taken on greater importance.

The cost of maintaining radioactive Xenon 133 in individual doses has however retarded the use of ventilation imaging in nuclear medicine. The activity metering apparatus of this invention is a dose dispenser particularly useful for gaseous radioactive Xenon 133 which, in an average hospital or medical laboratory, may reduce the cost of studies and use of radioactive Xenon 133 two to five fold. The gaseous radioactive Xenon 133 may thus be purchased in less expensive multi-Curie amounts and simply dispensed with simultaneous dose calibration for individual patient use. The improved apparatus of this invention is designed to dispense the required activity of radioactive gas from a shipping ampul through a metering valve into a serum vial. The activity present in the serum vial is then measured by a calibrated Geiger-Muller counter.

SUMMARY OF THE INVENTION

The metering apparatus of this invention is particularly adapted for metering a predetermined dose of radioactive gas, including gaseous radioactive Xenon 133, from a multi-Curie shipping ampul to a conventional serum vial. The apparatus includes a radioactively shielded ampul housing having a chamber for receiving a supply ampul of radioactive gas, a fine metering valve communicating with the ampul housing and a radioactively shielded vial housing having a chamber for receiving a partially evacuated serum or dose vial communicating with the metering valve. In the preferred embodiment of the apparatus, a hypodermic needle is provided in communication with the metering valve which extends into the vial chamber for communication with the serum vial through a septum closure. A Geiger-Muller tube or other suitable ionizing radiation detector is supported opposite an opening of the vial chamber and a meter, such as a standard laboratory rate meter or counter, is electrically connected to the radiation detector. The radiation detector may be adjusted relative to the vial chamber opening for calibration of the meter in milli-Curies. The meter then reads the activity of the radioactive gas in the serum vial in milli-Curies.

A multi-Curie shipping ampul is then received in the ampul housing in sealed relation. In the disclosed embodiment, a cylindrical metal plug is disposed within the ampul housing and the apparatus is pivotally mounted on a support. The apparatus is first tilted slightly such that the breaker is maintained away from the ampul seal during loading of the ampul. The apparatus is then tilted sharply downwardly, dropping the breaker plug into the ampul, breaking the seal and permitting the radioactive gas entry into the metering valve. A partially standard serum vial is then received in the chamber of the shielded vial housing for dispensing a predetermined dose of radioactive gas. In the preferred embodiment, the vial housing may be shifted toward the hypodermic needle to pierce the septum closure of the serum vial. A standard serum vial includes a metal cap having a plastic or synthetic self-sealing septum closure. The hypodermic needle than pierces the septum as the vial housing is shifted toward the needle and the serum vial is then in communication with the metering valve.

In the disclosed embodiment, the metering valve is a conventional needle-type straight valve, which may be manually adjusted to permit a small quantity of gas through the valve to the serum vial. The activity of the gas in the serum vial is then monitored by the Geiger-Muller tube. When a predetermined activity is reached, as read on the laboratory rate meter, the valve is closed and the vial is ready for use, such as described hereinabove.

The laboratory rate meter is calibrated in milli-Curies by inserting a serum vial having a predetermined activity in the shielded vial chamber. The Geiger-Muller tube is then adjusted toward and away from the chamber opening until the reading of the rate meter corresponds to the activity of the standard. The activity is then proportional to the counts per minute read by the meter and any predetermined activity may be dispensed into a serum vial following the procedure outlined above.

The metering apparatus for radioactive gas of this invention is therefore relative simple. Individual doses can be dispensed on an as needed basis or, if desired, doses can be prepared to precalibrated vials several days prior to use. A multi-Curie shipping ampul may be loaded in the apparatus in a very few minutes and, thereafter, predetermined doses of radioactive gas may be dispensed into serum vials in a matter of seconds. The apparatus of this invention will therefore reduce the cost of using radioactive gases, particularly Xenon 133, permitting the use of multi-Curie shipping ampuls.

Other advantages and meritorious features of the present invention will be more fully understood from the following description of the preferred embodiments, appended claims and the attached drawings, a brief description of which follows.

BRIEF DESCRIPTION OF THE DRAWINGS

FIG. 2 is a front view of the embodiment of the metering apparatus shown in FIG. 1, illustrating the operating positions of the metering apparatus; and FIG. 3 is a side view of the metering apparatus shown in FIGS. 1 and 2 in a vertical position.

DESCRIPTION OF THE PREFERRED EMBODIMENTS

Figure 1:
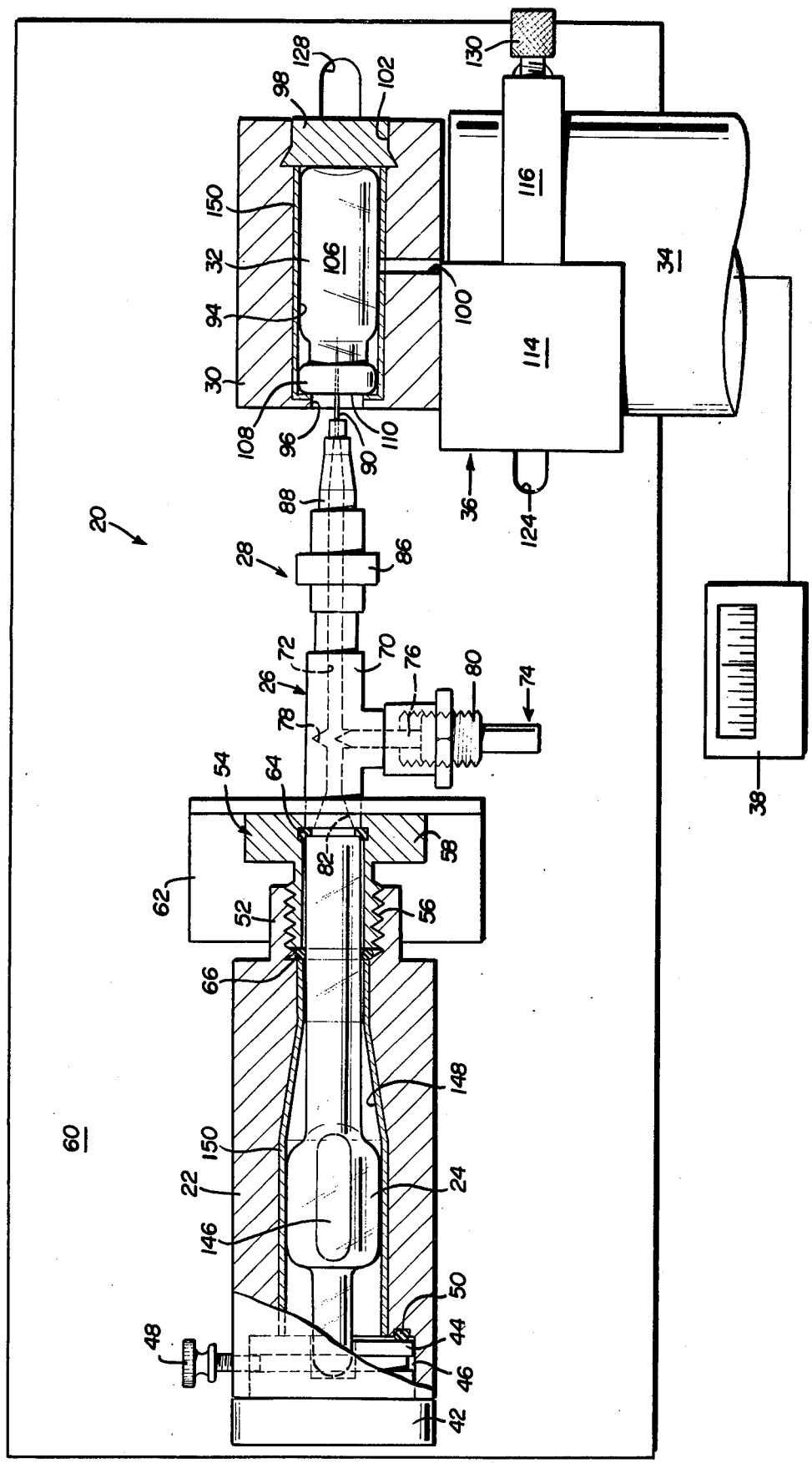
FIG. 1 is a front view, partially cross-sectioned, of one embodiment of the dose dispenser or metering apparatus of this invention.

The metering apparatus 20 illustrated in FIG. 1 includes an ampul housing 22 which receives multi-Curie shipping ampuls 24, a metering valve 26, hypodermic needle assembly 28 and a vial housing 30 which receives the serum or dose vials 32. In the disclosed embodiment, a Geiger-Muller tube 34 is adjustably supported adjacent the vial housing 30 by a clamp 36 and the Geiger-Muller tube is electrically connected to a conventional laboratory rate meter 38.

As described, the metering apparatus is adapted to meter or dispense predetermined activities of a radioactive gas from a multi-Curie shipping ampul, such as shown at 24 in FIG. 1, to conventional serum vials 32. The metering apparatus is particularly adapted to dispense gaseous radioactive Xenon 133 which is available in 5 cc shipping ampuls from Oak Ridge National Laboratories. The shipping ampul is flame sealed and formed of a laboratory glass, such as Pyrex, as described hereinbelow.

The ampul housing 22 in the disclosed embodiment includes an end closure 42 having a cylindrical plug portion 44 which is received within a counterbore within the housing, as shown in FIG. 1. The end plug 44 includes an annular groove 46 which receives a thumbscrew 48 through the housing wall to accurately position the closure in the open end of the ampul housing 22. An O-ring 50 is provided in the disclosed embodiment to seal the closure in the ampul housing. The opposed end 52 of the ampul housing is internally threaded to receive a conventional vacuum coupling 54.

The vacuum coupling 54 in the disclosed embodiment includes a male threaded end portion 56 which is threadeably received in the ampul housing 60, as shown in FIG. 1 and a cylindrical portion 58 which supports the apparatus 20 on the support plate 60. In the disclosed embodiment, the cylindrical portion 58 is soldered or otherwise secured to an angle plate 62, which in turn is welded or otherwise secured to the support plate 60. O-ring 64 seals the end of the shipping ampul and O-ring 66 is compressed into sealing relation by the male threaded portion 56 of the vacuum coupling, as described hereinbelow.

The metering valve 26 is a conventional straight needle valve which provides fine adjustment or metering of the gas flow. The disclosed embodiment of the metering valve includes a valve body 70, having a straight internal passage 72 and a stem portion 74, having a needle portion 76 which is received through the internal passage 72 into a conical valve seat 78. The gas flow through the passage 72 is accurately controlled by turning the stem portions 74, which threadably receives the male threaded portion 80 of the stem into the female threaded portion of the body portion 70, disposing the needle portion 76 into and out of the valve seat 78. The conical opening 82 to the valve is sealed to the shipping ampul 24 by O-ring 64. In the disclosed embodiment, the end of the valve body 70 is received through angle plate 62 into a counterbore in the cylindrical portion 58 of the vacuum coupling 54 and soldered or otherwise secured in place. A suitable metering valve is available from Nupro Company of Cleveland, Ohio, identified as Straight-S-1-SG.

The hypodermic needle assembly 28 is also available commercially. In the disclosed embodiment the assembly includes a "Luer-Lok" adapter 86 which is soldered or otherwise sealing secured to the valve body 70 of the metering valve 26 and a disposable needle assembly 88 having a projecting hypodermic needle 90. The disclosed Luer-Lok hypodermic needle assembly is available commercially from various sources including Sherwood Medical Industries and is commonly utilized in hospitals for injections. The adapter 86 and needle assembly 85 are generally interconnected by a bayonet-type connection.

The vial housing 30 includes a chamber 94 which receives the serum vial 32. The housing includes an opening 96 which receives the hypodermic needle 90, a closure 98 and an opening 100 transverse to the longitudinal axis of the chamber 94. The closure 98 in the disclosed embodiment is a slide which is received in a configured slot 102 in the housing 30, providing access to the vial housing chamber 94. The disclosed serum vial 32 is commercially available from various sources and includes a glass vial 106, a metal closure 108 which is crimped or otherwise secured to the lip of the vial and a self-sealing septum 110. A suitable serum vial is a 2ml serum vial available from Wheaton Glass Co. The vial is evacuated prior to receipt of the radioactive gas and includes a self-sealing septum in the form of a plastic diaphram.

In the disclosed embodiment of the apparatus, the aperture 100 in the vial housing 30 exposes the Geiger-Muller tube 34 to the serum vial 32, which is the source of radiation or activity to be measured. As described below, the housing is preferably shielded with a lead lining, or the like. The opening 100 thus serves as a collimator, focusing and limiting radiation reaching the Geiger-Muller tube. The size of the opening 100 must therefore be controlled, depending on the particular application for the metering apparatus. In metering patient doses of gaseous radioactive Xenon 133, for example, an opening of about 2 mm has been found very satisfactory.

In the disclosed embodiment, the Geiger-Muller tube is supported on the support plate 60 by a clamp 36. The clamp includes two clamping blocks 114 and 116 each having a cylindrical channel 118 and 120, respectively, as shown in FIG. 3. Block 114 is retained to the mounting plate 60 by a set screw or bolt 122, which is received in a slot 124 in the support plate 60. Similarly, vial housing 30 is retained to support plate 60 by a set screw or bolt 126 which is received in slot 128 in the support plate. The Geiger-Muller tube 34 and the vial housing 30 may therefore be slideably adjusted independently on the support plate 60 in the axis of slots 124 and 128, respectively. The Geiger-Muller tube is retained in the clamp by screw 130.

The Geiger-Muller tube may be a conventional collimated shielded Geiger-Muller tube normally utilized in combination with a conventional rate meter, such as is available from Victoreen Instrument, Company. The assembly measures the intensity of the radioactive source in counts per second. The metering apparatus of this invention is however adapted to indicate directly the activity of the gas in the serum vial. This is accomplished as follows.

First, the laboratory rate meter is calibrated by inserting a serum vial in the vial housing 30 having a predetermined activity in milli-Curies. In the preferred method, the vial contains a predetermined activity of the gas to be metered by the metering apparatus of this invention. If it has been determined that the standard has an activity of 20 milli-Curies, for example, the Geiger-Muller tube is adjusted toward and away from the opening 100 in the vial housing 30 until the rate meter indicates, for example, 200 counts per second, (CPS) or other suitable multiples of the detected count rate. The activity of a gas in the housing is then proportional to the indication of the rate meter 38. Thus, if it is desired to meter 30 milli-Curies of gas into the an evacuated serum vial, the meter will read 300 cps. The Geiger-Muller tube is adjusted in the clamp 36 by loosening the set screw 130 and adjusting the Geiger-Muller tube toward and away from the vial housing 30. The metering apparatus is then ready for use.

The first step in the procedure is to load a multi-Curie shipping ampul 24 in the ampul housing 22. This is accomplished in the preferred embodiment by tipping the support plate 60 to the position shown in solid lines in FIG. 2. As will be noted from FIG. 3, the support plate is pivotally mounted on a support rod 136 having a slide 138. Set screw 140 retains the slide 138 on the rod 136. The slide is pivotally connected at 142 to the support plate 60 by crimping the projecting portion of the slide 138, or by other suitable means. Prior to receipt of the shipping ampul in the ampul housing, a generally cylindrical steel rod 146 is received in the vacuum coupling 54 as shown in FIG. 2. The shipping ampul is then disposed in the ampul housing chamber 148 and the housing is threaded to compress the O-ring 66 against the ampul. The end closure 42 is then secured in place by set screw 48. The support plate is then turned sharply to a vertical position as shown in FIG. 3 and as shown in phantom in FIG. 4. This movement causes the ampul breaker 146 to break the flame seal of the shipping ampul 124, releasing the radioactive gas to the metering valve 126. The metering valve has been previously closed by turning valve stem 74 to seat needle 76 in the valve seat 78. The apparatus is now ready for dispensing a predetermined activity of radioactive gas into serum vials 32.

Previously evacuated serum vials are loaded into the vial housing 30 with the housing in the position shown in FIG. 2. The slide closure 98 is opened and a serum vial is inserted into the housing chamber 94. Set screw 126 releases the vial housing 30 and the housing is moved to the position shown in FIG. 1, piercing the vial septum 110 with hypodermic needle 90. The interior of the serum vial is now in communication with the passage 72 in metering valve 26. The valve may now be opened, permitting the radioactive gas to flow into the evacuated serum vial 32. Simultaneously, the activity in the serum vial is monitored by the Geiger-Muller tube 34. As the predetermined activity is reached, as indicated by the rate meter 38, the valve 26 is closed. Finally, the vial housing is shifted to the right in FIG. 1, permitting removal of the serum vial 32. As described, the septum 110 is self-sealing, retaining the radioactive gas in the serum vial. The vial may then be removed by sliding the closure 98 and removing the vial.

It will be understood that the preferred activity of the gas in the serum vial 32 will depend upon the particular application of the radioactive gas. As described, the metering apparatus of this invention was specifically developed for metering or dispensing doses of gaseous radioactive Xenon 133. In actual use, approximately 24 individual doses of Xenon 133 may be dispensed by the apparatus of this invention in 10 milli-Curie patient doses, reducing the cost of the milli-Curie doses by a factor of two to five-fold. Similar advantages will be obtained in dispensing other radioactive gases.

It will be understood that the details of the metering apparatus of this invention may be modified as desired or as required by the particular application. The apparatus is preferably utilized in an exhaust or fume hood to prevent exposure to the operator. The shipping ampul 24 and the serum vial 32 are preferably handled by remotely controlled equipment which is commercially available. The ampul housing 22 and vial housing 30 should be shielded to minimize irradiation of the operator. For example, the housings may be formed of steel having a lead lining 150. The remaining components may also be formed of a shielded material, although the radioactive gas is dispensed through the passage 72 for only a few seconds. Therefore, shielding is not considered required for the hypodermic assembly 28 or the valve 26.

The radioactive gas metering apparatus of this invention therefore combines the advantages of unit dose and multiple dose dispensing systems. The apparatus is relatively inexpensive to construct, relatively easy to operate, yet results in substantial savings in preparing unit doses of radioactive gas. Although the apparatus of this invention has been described with reference to a particular embodiment, it will be understood that the invention herein is limited only by the appended claims.

I claim:

1. An activity metering apparatus for radioactive gases, comprising:
   a shielded ampul housing having a chamber for receiving a shipping ampul of radioactive gas, a fine metering valve communicating with said housing chamber, a shielded vial housing having a chamber for receiving a vial communicating with said valve, said vial housing chamber having an opening, a Geiger-Muller tube opposite said vial housing chamber opening, a rate meter electrically connected to said Geiger-Muller tube and means permitting adjustment of said Geiger-Muller tube toward and away from said vial housing chamber opening for calibrating said rate meter to read the activity of the radioactive gas received within said vial housing chamber.

2. The metering apparatus defined in claim 1, including a hypodermic needle received within a second opening in said vial housing chamber, said hypodermic needle communicating with said metering valve, whereby radioactive gas received through said metering valve is received through said hypodermic needle to said vial housing chamber.

3. The metering apparatus defined in claim 2, characterized in that a cylindrical plug is loosely received with said ampul housing for breaking the seal of an ampul disposed within said ampul housing.

4. The metering apparatus defined in claim 3, characterized in that said apparatus is pivotally mounted on a support, whereby said plug may be moved within said ampul housing by tilting said apparatus to break the seal of an ampul received within said ampul housing.

5. An activity metering apparatus for metering predetermined activities of radioactive gas from a supply ampul to dose vials, comprising:
a radioactively shielded ampul housing having a chamber for receiving a supply ampul of radioactive gas, a fine metering valve communicating with said ampul housing chamber in sealed relation, a radioactively shielded vial housing having a chamber for receiving a dose vial having a self-sealing septum closure, said vial housing chamber having a first and second opening through said ampul housing, a hypodermic needle communicating with said metering valve in sealed relation extending into said vial housing chamber through said first opening for communication through the septum closure of a dose vial received within said vial housing chamber, an ionizing radiation detector opposite said second opening of said vial housing chamber, a meter electrically connected to said detector and means for adjusting said detector toward and away from said second vial housing chamber opening to calibrate said meter and to read the activity of the radioactive gas received within said vial housing chamber.

6. The metering apparatus defined in claim 5, characterized in that said apparatus is mounted on a support and said vial housing is adjustably mounted on said support for movement toward and away from said hypodermic needle to permit puncture of the septum closure of a dose vial received within said vial housing chamber.

7. The metering apparatus defined in claim 5, characterized in that a generally cylindircal metal plug is loosely received within said ampul housing chamber for breaking the seal of an ampul received within said ampul housing chamber.

8. The metering apparatus defined in claim 7, characterized in that said metering apparatus is pivotally mounted on a support, whereby said plug may be shifted within said ampul housing to break the seal of a supply ampul received within said ampul housing chamber.

9. The metering apparatus defined in claim 5, characterized in that a vacuum coupling is located between said metering valve and said ampul housing for receiving the tubular end of a supply ampul, said vacuum coupling including a cylindrical opening and an O-ring surrounding said opening for sealing the communication between a supply ampul received within said ampul housing chamber and said valve.

10. The activity metering apparatus defined in claim 5, characterized in that said vial housing chamber is generally cylindrical, with said first opening generally in the longitudinal axis of said chamber and said second opening transverse to the longitudinal axis adjacent the mid-portion of said chamber and said detector is a Geiger-Muller tube supported by an adjustable clamp opposite said second vial chamber opening.

11. A method of dispensing unit doses of radioactive gas from a multi-Curie shipping ampul to a serum vial, the metering apparatus including a shielded ampul housing having a chamber, a metering valve and a shielded vial housing having a chamber in communication with said ampul chamber through said metering valve, said vial housing having an aperture, an ionizing radiation detector supported adjacent said vial housing aperture and a meter electrically connected to said detector, said apparatus pivotally mounted on a support, comprising the steps of:
tilting the apparatus with the ampul housing opening upwardly at an angle;
inserting a weighted seal breaker in the ampul housing chamber;
inserting a multi-Curie shipping ampul having a center flame seal in the ampul housing and sealing the housing;
tipping the apparatus sharply with said ampul housing opening extending downwardly to break said flame seal of the shipping ampul;
opening said metering valve to permit the flow of radioactive gas into said serum vial; and
monitoring the activity of the radioactive gas in said serum valve with said radiation detector and meter.

12. The method defined in claim 11, wherein said apparatus includes a hypodermic needle in communication with said metering valve and said vial housing is slideably secured to said support, including inserting a serum vial having a self-sealing septum closure into said vial housing and sliding said vial housing toward said hypodermic needle to pierce the septum of said serum vial, whereby the interior of said serum vial is in communication with said metering vial.

13. The method defined in claim 11, wherein said detector is a Geiger-Muller tube adjustably supported on said support, including calibrating said meter by inserting a serum vial in said vial housing having a predetermined activity and adjusting said Geiger-Muller tube toward and away from said opening in said vial housing until said meter may be read in milli-Curies.

* * * * *